United States Patent [19]

Henry et al.

[11] Patent Number: 4,717,984
[45] Date of Patent: Jan. 5, 1988

[54] DEVICE FOR DIGITALLY DETERMINING AND SAFEGUARDING A THERMAL IMAGE

[75] Inventors: Gilles Henry, Paris; Christian Cadet, Taverny, both of France

[73] Assignee: La Telemecanique Electrique, France

[21] Appl. No.: 898,545

[22] Filed: Aug. 21, 1986

[30] Foreign Application Priority Data

Aug. 23, 1985 [FR] France ............... 85 12663

[51] Int. Cl.⁴ .............................................. H02H 5/04
[52] U.S. Cl. ..................................... 361/25; 361/92; 361/103; 207/66
[58] Field of Search ................. 361/23, 25, 91, 92, 361/103; 307/64, 66; 365/229; 364/557, 483

[56] References Cited

U.S. PATENT DOCUMENTS

| | | | |
|---|---|---|---|
| 4,216,421 | 8/1980 | Dupont | 361/25 X |
| 4,288,865 | 9/1981 | Graham | 307/64 X |
| 4,291,355 | 9/1981 | Dinger | 361/25 X |
| 4,413,325 | 11/1983 | Elfner et al. | 361/25 X |
| 4,573,132 | 2/1986 | Boothman et al. | 361/25 X |
| 4,617,473 | 10/1986 | Bingham | 307/66 |

Primary Examiner—A. D. Pellinen
Assistant Examiner—Derek S. Jennings
Attorney, Agent, or Firm—William A. Drucker

[57] ABSTRACT

A device is provided for digitally determining and safeguarding a thermal image including a processor connected to at least one sensor able to form a digital image of the thermal state of an apparatus, a random access memory containing the thermal image formed by the processor and a safeguard for storing, should there be a voltage cut, the instantaneous thermal image. The safeguard includes a programmable digital counter fed by a capacity curing power-cuts and equipped with a clock which modifies its counting state for the duration of the absence of voltage. The processor reads the state of the counter after restoration of the voltage.

4 Claims, 9 Drawing Figures

DEVICE FOR DIGITALLY DETERMINING AND SAFEGUARDING A THERMAL IMAGE

BACKGROUND OF THE INVENTION

1. Field of the Invention

The present invention relates to a device for digitally determining and safeguarding the thermal image of an apparatus or a load, more particularly applicable to thermal protection relays using a microprocessor for elaborating the thermal image of a motor.

2. Description of the Prior Art

Some electronic thermal protection relays for motors have a microprocessor which serves more particularly for simulating the thermal state of the motor from the measurement of the currents thereof; this simulation is made in accordance with well known heating and cooling exponential curves.

it is desirable for the protection relay to continue simulation of cooling for example for several tens of minutes after a power-cut in the supply to the motor, this power-cut occurring either under the effect of the protection relay whose thermal image has exceeded and admissible threshold, or under the effect of a trip-out or a cut in the power supply to the motor and the relay. In this latter case, continuing the simulation of cooling involves maintenance of the power supply for a part at least of the electronic circuits of the relay after switching off so as to have, during the subsequent starting up again of the motor, an acceptable thermal image thereof. The thermal modelization may be continued by means of the microprocessor, by supplying it with a battery or a buffer capacity; this solution provides however expensive and too restrictive as to the choice of the technology and of the type of microprocessor used.

It is then important to design a reduced consumption device capable of being added to the microprocessor and to be supplied should the power supply to the relay fail by a relatively low buffer capacity for continuing the elaboration of the thermal state during the duration of the shut down.

The Pat. No. DE-3 137 496 has proposed storing in the capacity of an RC circuit, at the time of the voltage trip-out caused by the relay, the thermal image elaborated by the microprocessor, then letting the capacity discharge into the resistor of the RC whose time constant allows the simulation of the characteristic cooling exponential of the motor to be continued; on switching on again, the microprocessor reads the analog voltage value at the terminals of the RC by means of an analog-digital converter and continues the simulation.

Such a device has the drawback of requiring an analog member and a correlative analog-digital conversion, even digital-analog conversion if it is desired to charge the capacity with a voltage which is a function of the thermal image.

The applicant starts from the discovery that simulation of the cooling of the motor during a voltage trip-out may be simplified by substituting for the cooling exponential, at least one straight line segment whose slope is chosen so as to be adapted to the "hot" part of the exponential.

SUMMARY OF THE INVENTION

The aim of the invention is to safeguard the thermal image elaborated by a processor associated with a thermal protection apparatus, in the case of a cut in the power supply thereof, by updating the thermal image in an approximate way, this image being recoverable by the processor once the voltage has been restored.

Another aim is to associate with the processor a very low consumption digital circuit which is simple, inexpensive and compact for updating and readily tansferring the approximate thermal image.

The invention relates to a device for digitally determining and safeguarding the thermal image of an apparatus, of a machine or of an enclosure likely to overheat, the device being connected to a voltage source and including a processor connected via an interface to at least one sensor and capable of forming a digital image of the state of the apparatus, a random access memory associated with the processor and containing, with a view to processing or control, the thermal image elaborated by the processor, and a safeguard device for storing the thermal image contained in the random access memory in response to a cut-off signal transmitted to the processor for representing a lack of voltage.

According to the invention, the safeguard device includes a programmable digital counting member connected to the processor and having at least one counter with a clock which modifies its counting state during the duration of the lack of voltage, the processor including means for reading the state of the counter after the voltage is restored.

The frequency of the clock of the counter is determined so that the straight line segment representing the evolution of the approximate thermal image follows the "hot" part, that is to say rapidly decreasing part, of the cooling exponential curve.

The counter may effect a count representative of the time elapsed since the appearance of the voltage fault, whereas the storage of the thermal image on the appearance of the voltage fault is provided in a memory safeguarded by a capacitor, so as to allow the processor to recalculate the cooling on restoration of the voltage, from the starting thermal state and from the time elapsed.

Preferably the counter is itself programmable and it is loaded by the processor in response to the cut-off signal with an initial counting state which is a function of the instantaneous thermal image contained in the random access memory on the appearance of the voltage fault. The result is simpler connection and a reduced occupation of the surface of the support of the processor and of the programmable digital timing member.

The processor is preferably a microprocessor one output of which may generate rapid frequency pulses, this output being connected to the digital timing member so as to take the place of the slow clock thereof by forcing rapid pulse trains whose number is a function of the thermal image contained in the random access memory, following a change of state of the cut-off signal.

The result is that on the voltage cut-off, the microprocessor thus rapidly brings the counter to a first counting state which is a bi-univocal function of the instantaneous thermal image of the random access memory and that on restoration of the voltage the microprocessor recovers a second counting state by rapidly finishing the counting by forcing the clock of the counter until the output of the digital timing member changes state.

BRIEF DESCRIPTION OF THE DRAWINGS

Other features and advantages will appear from reading the description of a non-limitative embodiment of the invention with reference to the accompanying drawings.

DESCRIPTION OF THE PREFERRED EMBODIMENT

Figure 1:
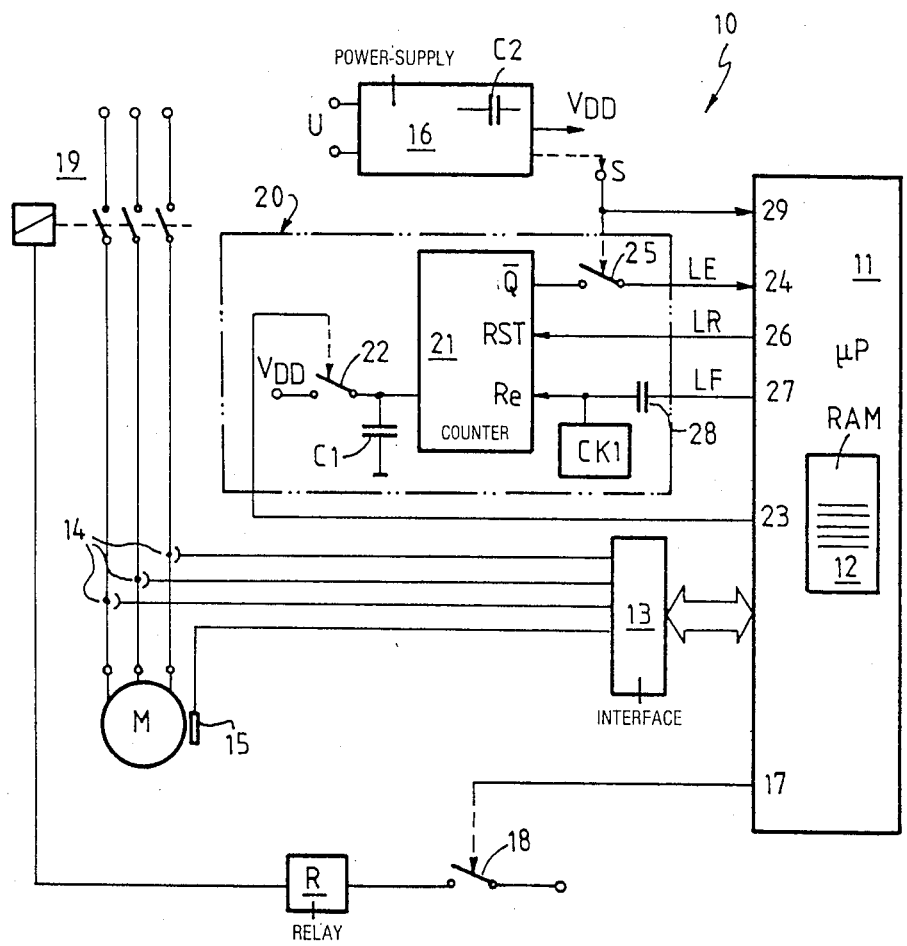
FIG. 1 is a block diagram of a thermal protection relay for a motor including the device of the invention.

The thermal protection relay 10 of FIG. 1 includes a microprocessor 11 with which are associated an internal or external random access memory 12 and an interface 13 connected to current sensors 14 disposed in the lines of an AC supply network of a member under the control for example of a motor M and/or of temperature sensors 15.

the microprocessor 11 and the other components of the relay are themselves fed from the AC supply network via a power supply 16; the microprocessor forms a model in a way known per se of the thermal image of motor M from data delivered by the current 14 and/or temperature 15 sensors to the interface 13. This thermal image being stored in the random access memory 12.

When the digital thermal image exceeds a given threshold $\theta$ max (FIG. 2), the microprocessor acts via an output 17 on a switch 18 which determines via an appropriate relay means the opening of power switches 19 for cutting off the supply to the motor.

According to the invention, digital means are provided for continuing the formation of an approximate model of the thermal image of the motor should a trip-out or a voltage fault of the network occur.

These means include a programmable digital counting member 20 connected to microprocessor 11 by data and control lines namely a status line LE, a reset line LR and a forcing line LF. Member 20 is formed simply in the present embodiment by a programmable counter 21 and by a few elements associated with this counter.

For continuing the power supply to the digital counting member 20 during the maximum desired trip-out time a capacity C1 is provided connected to the power supply 16 of the relay via an isolating switch 22. Switch 22 is normally closed so as to allow charging of capacity C1; it is opened by a signal coming from an output 23 of the microprocessor after trip-out of the voltage of the network, this signal lasting while there is an absence of voltage on the microprocessor and being maintained after restoration of the voltage of the network for a lapse of time allowing the internal power supply 16 of the relay to guarantee the independence of the microprocessor and the integrity of its exchanges with member 20.

The status line LE connects an output $\bar{Q}$ (or Q depending on the case) of the digital counting member 20 to an input 24 of the microprocessor; A switch for example a MOS transistor, controlled by a signal S representative of the voltage trip-out is provided in line LE.

The reset line LR connects an output 26 of the microprocessor to an input RST of the programmable counter 21. The forcing line LF connects an output 27 of the microprocessor to an input Re of the programmable counter 21; line LF includes a filtering member 28 such as a capacitor.

Member 20 includes a slow clock CK1 connected to the input Re of the counter so that this latter receives either the signal CK1, for example at a frequency of 10 Hz, or a signal CK2 generated by the microprocessor in the form of rapid pulse trains, for example at a frequency of the order of 30 kHz. The low frequency of the signal CK1 is adjustable to allow adjustment of the slope of the cooling straight line segment.

There exists a biunivocal relationship between the cooling exponential programmed in the microprocessor and the variation of the counting state of the programmable digital counting member.

A guard dog and local and remote resetting lines are moreover connected to the microprocessor. A capacity C2 is contained in the power supply 16 for ensuring a brief independence of the microprocessor 11.

The operation of the device will now be described with reference to FIGS. 2 to 5E.

Figure 2:
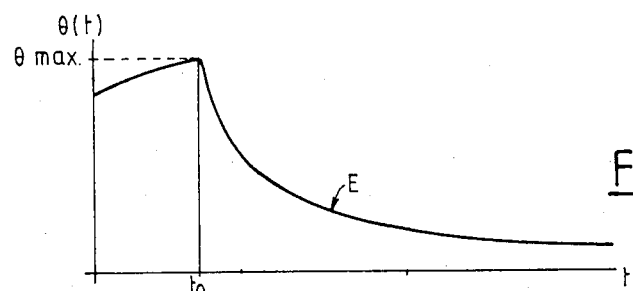
FIG. 2 is a graph showing the variation of the thermal image elaborated by the microprocessor of the relay.
Figure 3:
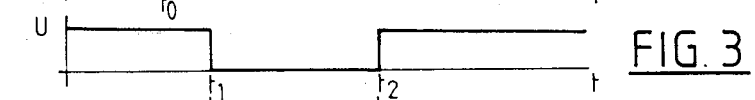
FIGS. 3 and 4 show a sequence of cutting-off and restoring the supply voltage for the relay and respectively the corresponding approximate thermal image.
Figure 4:
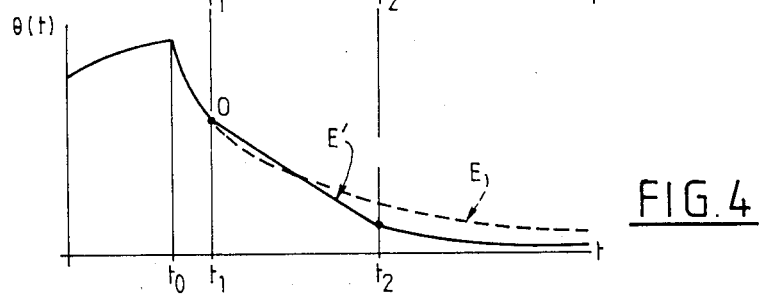

The protection relay 10 forms, from the data delivered by the sensors 14, a model of the digital thermal image $\theta$ of the motor M. This image is stored in the random access memory 12. As long as it remains less than a value $\theta$ max and if a trip-out occurs of the voltage U supplying the relay, the microprocessor orders the motor to be stopped; when the thermal image $\theta$ reaches at time $t_o$ the value $\theta$ max (FIG. 2), the output 17 of the microprocess or 11 causes, through switch 18 and relay R, the power switches 19 to open. Motor 11 is no longer supplied with power and begins to cool down, whereas its thermal image $\theta$ begins to reduce in accordance with an exponential curve E (FIG. 2).

If there occurs a trip-out of the voltage U supplying the relay at time t1 (FIG. 3), the relay will continue to simulate, along a straight line segment OE', the cooling of the motor for a time which may reach several tens of minutes.

Figure 5A:
FIGS. 5A–5E show a timing diagram of different signals and states representative of the exchanges between the programmable digital timing member and the microprocessor.
Figure 5B:
Figure 5C:
Figure 5D:

The trip-out signal S is generated and on the one hand closes the switch 25 and on the other activates the input 29 of the microprocessor which generates at its output 26 a pulse (FIG. 5A) transmitted by the line LR to the input RST of the programmable counter 21; this latter is then set and begins to decrement (FIG. 5E) from Nm under the effect of clock signal CK1 which activates the input Re (FIG. 5D) whereas the output $\bar{Q}$ of counter 21 passes to logic state 1 (FIG. 5B), this state being transmitted by line LE to the input 29 of the microprocessor. Rapid pulse trains are then propagated through the output 27 of the microprocessor, line LF and the filtering member 28, as far as the input Re of the counter 21 which they force by replacing the low frequency clock signal CK1. The number of pulses k (Nm−N1) is representative of the thermal image $\theta$ (t1). When the down counting reaches N1 at time t'1, the signal 27 ceases and only the slow clock signal CK1 continues (FIGS. 5C and 5D). The Q output of the programmable counter 20 remains at logic state 1 until the down counting has reached a given value.

Figure 5E:
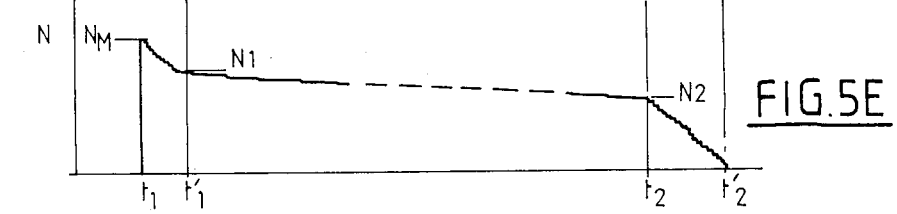

When at time t2 the voltage U supplying the relay is restored, the microprocessor verifies, at its input 24, the logic state of $\bar{Q}$; if $\bar{Q}=0$, the thermal state of the motor is considered as 0; if $\bar{Q}=1$ that means that the down counting has not reached the given value and the microprocessor emits at its output 27 rapid pulses which force the input Re of the counter, so as to decrement this latter rapidly. The number kN2 of pulses is counted by the microprocessor until $\overline{Q}$ passes to the logic state 0 at time t'2 (FIGS. 5E and 5B). Since the number of pulses is significant of the approximate thermal state on restoration of the voltage, it is taken by the microprocessor as the approximate thermal state at time t2.

The capacity C2 included in the power supply 16, is intended to ensure a brief independence of the microprocessor and requires a certain charging time on restoration of the voltage. It should be noted that the microprocessor only begins to resume the thermal state of the programmable counter if it has a sufficient reserve of energy to undergo a new power supply cut.

Switch 22 is only closed by the output 23 of the microprocessor on restoration of the voltage if Q is at logic state 1, so as to avoid automatic resetting of the programmable counter.

It goes without saying that modifications may be made to the device described without departing from the spirit of the invention. The device is in particular applicable to any electric protection apparatus comprising a processor forming a thermal model of an apparatus or of a load capable of heat dissipation, for effecting a linear incrementation or decrementation of the thermal phenomenon should a break in the power supply to the apparatus occur.

What is claimed is:

1. A device for digitally determining and safeguarding a thermal image, connected to a voltage source and including a processor connected via an interface to at least one sensor and capable of forming a digital image of the thermal state of an apparatus or of a load in the occurence of a power-cut having a predetermined maximum duration, a random access memory associated with the processor and containing the thermal image formed by the processor, and safeguard means including a programmable digital counter unit connected to the processor and to a capacity determined for ensuring the power supply of said counter unit during said maximum duration, and having at least one counter equipped with a clock which modifies its counting state during the time when the voltage is absent, the processor having means for reading the state of the counter after restoration of the voltage, the counter being programmable and loaded by the processor in response to a cut-off signal with an initial counting state which is a function of the instantaneous thermal image contained in the random access memory on the occurence of the lack of voltage.

2. The digital device as claimed in claim 1, wherein the programmable digital counter unit has a logic output changing state at the end of counting and connected by a status line to an input of the processor, whereas the processor has an output capable of generating a signal formed of rapid frequency pulses and connected by a forcing line to the digital counter unit for substituting said rapid signal for said slow clock signal thereof following the change of state of a cut-off signal representative of the lack of voltage.

3. The digital device as claimed in claim 2, wherein the status line connecting the output of the digital counter unit to the input of the processor includes a switch controlled by the power-cut signal.

4. The digital device as claimed in claim 1, wherein the capacity insuring the power supply of the digital counter unit during the time of the voltage fault is connected to the voltage source via an isolating switch controlled by the processor and kept open as long as the power supply independence of the processor is not achieved.

* * * * *